United States Patent
Rice et al.

(10) Patent No.: US 9,114,488 B2
(45) Date of Patent: Aug. 25, 2015

(54) SUPERALLOY ROTOR COMPONENT AND METHOD OF FABRICATION

(75) Inventors: Derek A. Rice, Phoenix, AZ (US); Brian A. Hann, Avondale, AZ (US); Andrew F. Hieber, Scottsdale, AZ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 2186 days.

(21) Appl. No.: 11/602,558

(22) Filed: Nov. 21, 2006

(65) Prior Publication Data

US 2008/0115358 A1  May 22, 2008

(51) Int. Cl.
| | |
|---|---|
| B21K 25/00 | (2006.01) |
| B23P 15/00 | (2006.01) |
| B22F 3/15 | (2006.01) |
| B22F 5/00 | (2006.01) |
| B22F 5/04 | (2006.01) |
| C22C 19/03 | (2006.01) |
| C22C 19/07 | (2006.01) |

(52) U.S. Cl.
CPC ............... *B23P 15/006* (2013.01); *B22F 3/15* (2013.01); *B22F 5/009* (2013.01); *B22F 5/04* (2013.01); *C22C 19/03* (2013.01); *C22C 19/07* (2013.01); *B22F 2999/00* (2013.01)

(58) Field of Classification Search
CPC ........ B23P 15/02; B23P 15/04; B23P 15/006; B21D 26/055; F01D 5/34; F01D 5/282; F01D 5/3061
USPC ................... 29/889.21, 889.72, 889.2, 889.7, 29/889.71, 889.23, 889; 419/8, 49
See application file for complete search history.

(56) References Cited

U.S. PATENT DOCUMENTS

| | | | |
|---|---|---|---|
| 3,888,663 A | 6/1975 | Reichman | |
| 3,940,268 A | 2/1976 | Catlin | |
| 3,996,048 A * | 12/1976 | Fiedler | 419/5 |
| 4,329,175 A * | 5/1982 | Turner | 419/6 |
| 4,383,809 A | 5/1983 | Hoffmuller | |
| 4,383,854 A | 5/1983 | Dembowski et al. | |
| 4,445,259 A | 5/1984 | Ekbom | |
| 4,659,288 A | 4/1987 | Clark et al. | |

(Continued)

FOREIGN PATENT DOCUMENTS

| | | | |
|---|---|---|---|
| EP | 0322224 A2 | 6/1989 | |
| JP | 10008109 A * | 1/1998 | ............ B22F 3/15 |

OTHER PUBLICATIONS

Machine Translation of JP 10-008109, Watanabe, Jan. 13, 1998.*

(Continued)

*Primary Examiner* — Ryan J Walters
(74) *Attorney, Agent, or Firm* — Ingrassia Fisher & Lorenz, P.C.

(57) ABSTRACT

A rotor component assembly including at least one void space formed therein that provides for reduction in weight of the component and/or cooling of the component during operation. The rotor component is formed by positioning a coated mild steel insert within a mold having an internal cross-section substantially the same in dimensions as the final rotor component. The mold is filled with a superalloy metal powder and undergoes hot-isostatic pressing to consolidate the powder about the coated core insert and form a superalloy structure. The mold is removed from about the superalloy structure and the core insert is removed from within the superalloy structure, thereby defining the at least one internal void within the rotor component.

16 Claims, 14 Drawing Sheets

(56) References Cited

U.S. PATENT DOCUMENTS

| | | | |
|---|---|---|---|
| 4,710,345 | A | 12/1987 | Doi et al. |
| 6,168,871 | B1 | 1/2001 | Ritter et al. |
| 6,210,633 | B1 | 4/2001 | Kratt et al. |
| 6,482,533 | B2 | 11/2002 | Van Daam et al. |
| 7,641,847 | B2 * | 1/2010 | Voice et al. ............ 264/604 |
| 7,687,021 | B2 * | 3/2010 | Imbourg et al. ............ 419/8 |
| 2004/0126266 | A1 | 7/2004 | Jackson et al. |
| 2005/0135958 | A1 | 6/2005 | Thorne et al. |
| 2006/0078455 | A1 | 4/2006 | Troitski et al. |

OTHER PUBLICATIONS

EP Search Report, EP 07121059.5-2122/1970147 dated Mar. 23, 2012.

EP Exam Report for Application No. EP 07 121 059.5 dated May 13, 2014.

EP Search Report for Application No. EP 07 121 059.5 dated Feb. 11, 2014.

EP Examination Report for EP 07121059.5-1362 dated Jan. 15, 2015.

* cited by examiner

SUPERALLOY ROTOR COMPONENT AND METHOD OF FABRICATION

TECHNICAL FIELD

The present invention generally relates to aircraft engine rotor components and, more particularly, to air turbine engine compressor impellers and turbine disks that incorporate internal voids and/or passages as a means for cooling and/or reducing the weight of the components and method of fabrication.

BACKGROUND

Gas turbine engines are often used to power aircraft and industrial power. A gas turbine engine may include, for example, five major sections, a fan section, a compressor section, a combustor section, a turbine section, and an exhaust section. The fan section is positioned at the front, or "inlet" section of the engine, and includes a fan that induces air from the surrounding environment into the engine, and accelerates a fraction of this air toward the compressor section.

The compressor section raises the pressure of the air it receives from the fan section to a relatively high level. Low and high pressure compressor components such as compressor blades and impellers are primary components in the cold section for any turbine engine. The compressed air from the compressor section then enters the combustor section, where a ring of fuel nozzles injects a steady stream of fuel. The injected fuel is ignited by a burner, which significantly increases the energy of the compressed air.

The high-energy compressed air from the combustor section then flows into and through the turbine section, causing rotationally mounted turbine blades to rotate and generate energy. Specifically, high-energy compressed air impinges on turbine vanes and turbine blades, causing the turbine to rotate. The air exiting the turbine section is exhausted from the engine via the exhaust section, and the energy remaining in this exhaust air aids the thrust generated by the air flowing through a bypass plenum.

Gas turbine engines, such as the one described above, typically operate more efficiently with increasingly hotter turbine temperatures. To maximize the efficiency of gas turbine engines, attempts have been made to form rotor components, such as compressor impellers and turbine discs having higher operating temperature capabilities. In particular, there is considerable commercial interest in superalloys for compressor and turbine rotating components which exhibit strength and creep resistance at relatively high temperatures (e.g., 1300-1500 F.°), as well as resistance to fatigue crack initiation at relatively lower temperatures (e.g., 500-1100 F.°). Many gas turbine engine components are now being made of nickel-based superalloys, which exhibit high temperature strength, but can be both difficult and costly to manufacture.

Many titanium (Ti) engine components, such as compressor impellers and disks, are currently being replaced by nickel (Ni) based components, including nickel based superalloys, with an addition of significant weight. In addition, the components, or methods of fabrication, do not include for any means for internal cooling of components within the component structure. Furthermore, special coatings may be required to mitigate environmental degradation of these titanium (Ti) and/or nickel (Ni) alloy components.

Temperatures within future gas turbine engines are increasing beyond the capabilities currently available from Ti and Ni based alloys. There is a need for gas turbine rotor components and a method of fabricating these rotor components that include a means for reducing the weight of the components and provides cooling of the components thereby enabling more efficient operation at higher temperatures. In addition it is desirable that the improved components and method of forming the components result in a cost effective method of manufacture and resultant component part. The present invention addresses one or more of these needs.

Furthermore, other desirable features and characteristics of the present invention will become apparent from the subsequent detailed description and the appended claims, taken in conjunction with the accompanying drawings and the foregoing technical field and background.

BRIEF SUMMARY

There has now been developed a method of forming a rotationally mounted rotor component having at least one internal void space therein. In one embodiment, the method comprises the steps of: forming a mold having an internal cross-section shape that is substantially identical to that of the rotor component; positioning a core insert within the mold, the core insert having a cross-section shape that is substantially identical to the at least one internal void space; coating the core insert with a diffusion barrier; filling the mold with a superalloy metal powder; hot-isostatic pressing the mold and powder to consolidate the powder about the core insert and form a superalloy structure; removing the mold from the superalloy structure; removing the core insert from the superalloy structure, thereby defining the at least one internal void within the rotor component.

In a further embodiment, still by way of example only, there is provided a method of forming a rotor component having at least one internal void formed therein comprising the steps of: assembling a steel can defining a mold having an internal cross-section shape that is substantially identical to that of a resultant rotor component; positioning a coated mild steel core insert within the mold, the mild steel core insert having a cross-section shape that is substantially identical to a resultant at least one internal void; filling the steel can with a superalloy metal powder and sealing the steel can; hot-isostatic pressing the mold and powder to consolidate the powder about the coated mild steel insert and form a superalloy structure; machining away the steel can from the superalloy structure; chemically milling away the coated mild steel core insert from the superalloy structure, thereby defining the at least one internal void within the rotor component; machining the rotor component; and heat treating the rotor component.

Other independent features and advantages of the improved method of forming a rotor component will become apparent from the following detailed description, taken in conjunction with the accompanying drawings which illustrate, by way of example, the principles of the invention.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Before proceeding with a detailed description, it is to be appreciated that the described embodiment is not limited to use in conjunction with a particular type of turbine engine, or even to use in a turbine. Thus, although the present embodiment is, for convenience of explanation, depicted and described as being implemented in a turbofan gas turbine jet engine, it will be appreciated that it can be implemented in various other types of turbines, and in various other systems and environments.

Figure 1:
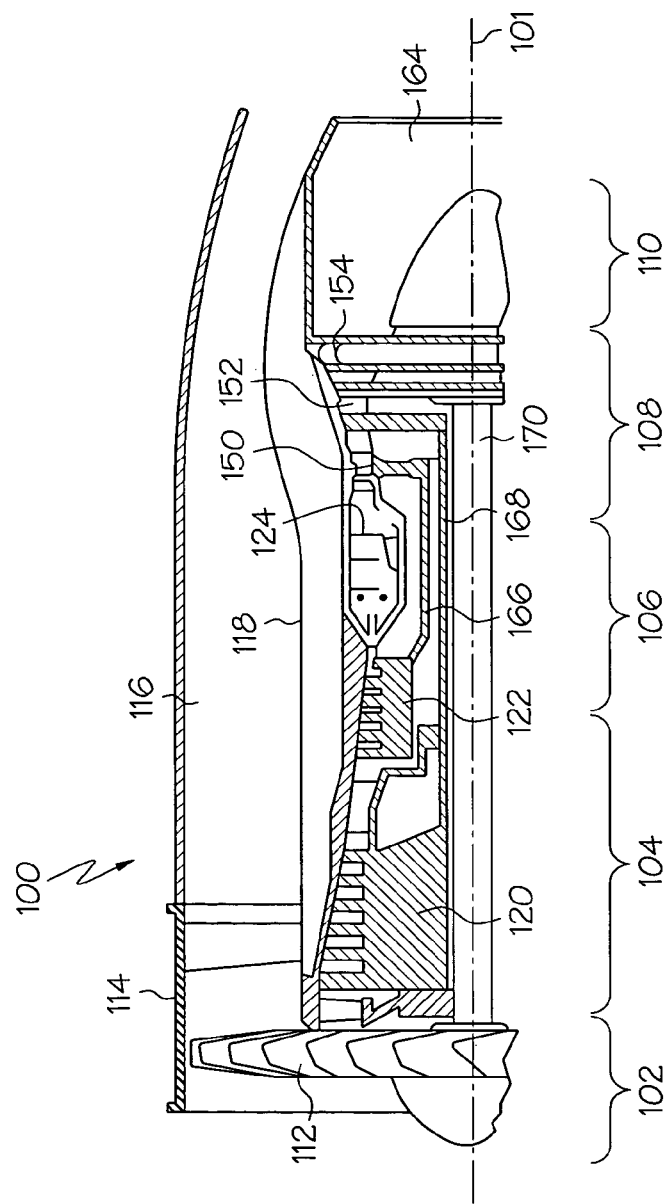
FIG. 1 is a simplified is a perspective view of an exemplary turbine engine according to the present invention.
Figure 2:
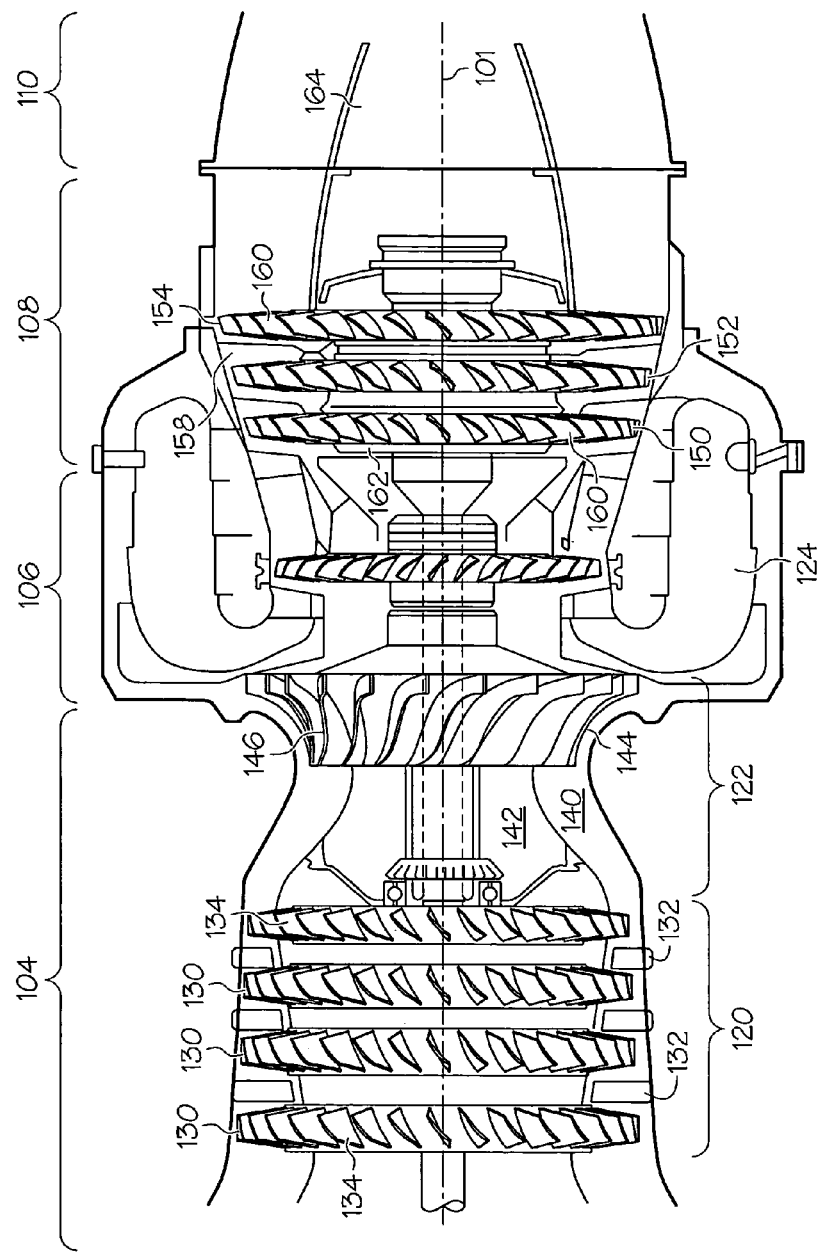
FIG. 2 is a close up cross-section side view of the compressor, combustor, turbine, and exhaust sections of the exemplary gas turbine engine depicted in FIG. 1.

Referring now to FIGS. 1 and 2, an exemplary embodiment of a turbofan gas turbine jet engine 100 is depicted in FIG. 1 and includes an intake section 102, a compressor section 104, a combustion section 106, a turbine section 108, and an exhaust section 110. In FIG. 1, only half the structure is shown, it being substantially rotationally symmetric about a centerline and axis of rotation 101 FIG. 2 illustrates a close up cross-section side view of the compressor 104, combustor 106, turbine 108 and exhaust sections 110 of the exemplary gas turbine engine depicted in FIG. 1. As best illustrated in FIG. 1, the intake section 102 includes a fan 112, which is mounted in a fan case 114. The fan 112 draws air into the intake section 102 and accelerates it. A fraction of the accelerated air exhausted from the fan 112 is directed through a bypass section 116 disposed between the fan case 114 and an engine cowl 118, and provides a forward thrust. The remaining fraction of air exhausted from the fan 112 is directed into the compressor section 104.

The compressor section 104 includes two compressors, an intermediate pressure compressor 120, and a high pressure compressor 122. The intermediate pressure compressor 120 raises the pressure of the air directed into it from the fan 112, and directs the compressed air into the high pressure compressor 122. As best illustrated in FIG. 2, the intermediate pressure section 120 includes multiple stages, each including a rotor 130 and a stator 132. Each of the rotors 130 has a plurality of rotor blades 134. As the rotors 130 rotate, the rotor blades 134 force air through each of the stators 132 in a subsequent stage.

The compressor high pressure section 122, in the depicted embodiment, includes a high pressure diffuser case 140, a shroud, and a rotationally mounted high pressure impeller 144. The high pressure diffuser case 140 couples the compressor low pressure section 120 to the compressor high pressure section 122 and directs exhausted air into the high pressure impeller 144. The high pressure impeller 144 has a plurality of vanes 146 extending therefrom that accelerate and compress the air. The high pressure impeller 144 compresses the air still further, and directs the high pressure air into the combustion section 106.

In the combustion section 106, which includes a combustor 124, the high pressure air is mixed with fuel and combusted. The combustor 124 receives the high pressure air from the compressor section 104 and mixes it with fuel to generate combusted air. The combusted air is then directed into the turbine section 108.

In this particular example, the turbine section 108 includes three turbines disposed in axial series flow, although it should be understood that any number of turbines may be included according to design specifics. More specifically, FIG. 1 depicts a high pressure turbine 150, an intermediate pressure turbine 152, and a low pressure turbine 154. Propulsion gas turbine engines may comprise only a high pressure turbine and a low pressure turbine. The expanding combusted air from the combustion section 106 expands through each turbine, causing it to rotate. More specifically, the hot combustion gases generated by the combustor 124 are directed against stationary turbine vanes 158. The turbine vanes 158 turn the high velocity gas flow partially sideways to impinge on a plurality of turbine blades 160 mounted on rotatable turbine disks 162 in each of the turbines 150, 152 and 154. The force of the impinging gas causes the turbine disks 162 to spin at high speed. The air is then exhausted through a propulsion nozzle 164 disposed in the exhaust section 110, providing addition forward thrust. As the turbines 150, 152 and 154 rotate, each drives equipment in the engine 100 via concentrically disposed shafts or spools as best seen in FIG. 1. Specifically, the high pressure turbine 150 drives the high pressure compressor 122 via a high pressure spool 166, the intermediate pressure turbine 152 drives the intermediate pressure compressor 120 via an intermediate pressure spool 168, and the low pressure turbine 154 drives the fan 112 via a low pressure spool 170. Engines may comprise one spool, two spools, or three spools.

Figure 3:
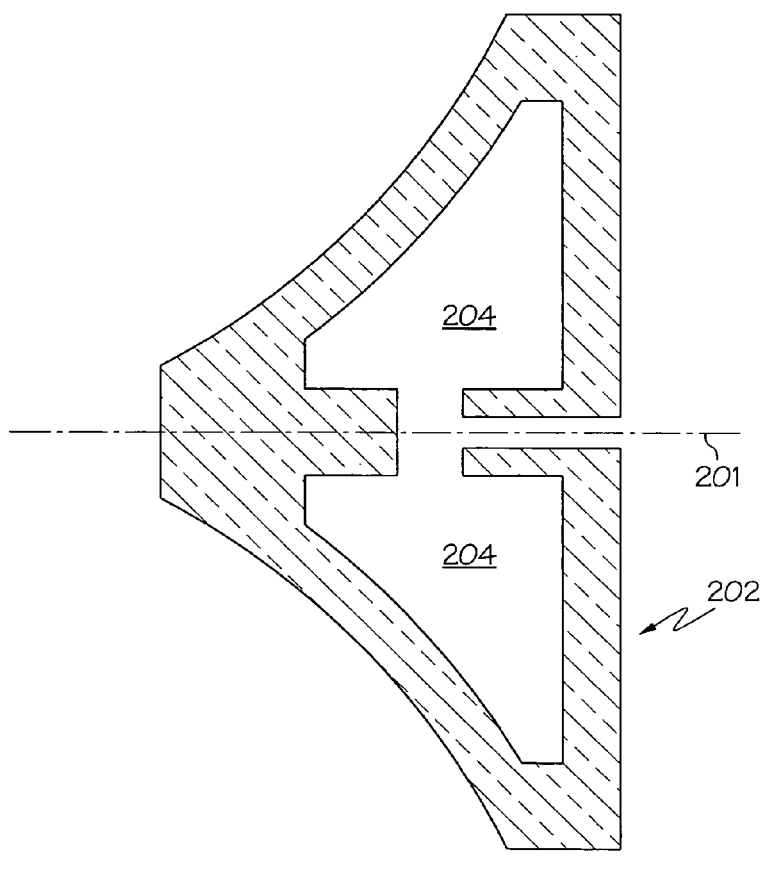
FIG. 3 is a simplified partial cross-sectional view of an impeller of FIG. 2 including an internal void according to the present invention.

Referring now to FIG. 3, illustrated is a simplified partial side sectional view of a rotor component 200, and more particularly, an impeller 202 manufactured according to a first embodiment of the present invention. The impeller 202 is formed generally similar to the impeller 144 of FIGS. 1 and 2 positioned in the compressor section 106. During operation compressed air generates heat and the impeller 202 is typically exposed to temperatures in excess of 1000 F. To accommodate the generation of this heat, the impeller 202 is formed of Ti alloy as has previously been taught in the art. To enable higher operating temperatures superalloys are being considered for the fabrication of impeller disks; however, component weight then becomes excessive. Superalloys that may be used to form the impeller 202 include cobalt-based or nickel-based superalloys that can broadly be defined as comprising at least one of carbon, aluminum, tantalum, cobalt, titanium, iron, vanadium, copper, lanthanum, chromium, molybdenum, niobium (columbium), rhenium, tungsten, hafnium, boron, zirconium, silicon, yttrium, or nickel. These superalloys possess good high temperature properties and many other advantages for use in turbine engines, such as the turbine engine 100 described above. In contrast to components formed of previous conventional material, rotor components formed of superalloy material typically weigh more and may increase the overall weight of the impeller 202 to an unacceptable level.

In this particular embodiment of the impeller 202, a plurality of internal voids 204 are formed to alleviate this increase in weight. The internal voids 204 define a plurality of passageways and provide a reduction in overall weight of the impeller 202. In a preferred embodiment, the internal voids 204 are formed in relatively low stress areas to mitigate the occurrence of structural fatigue.

Figure 4:
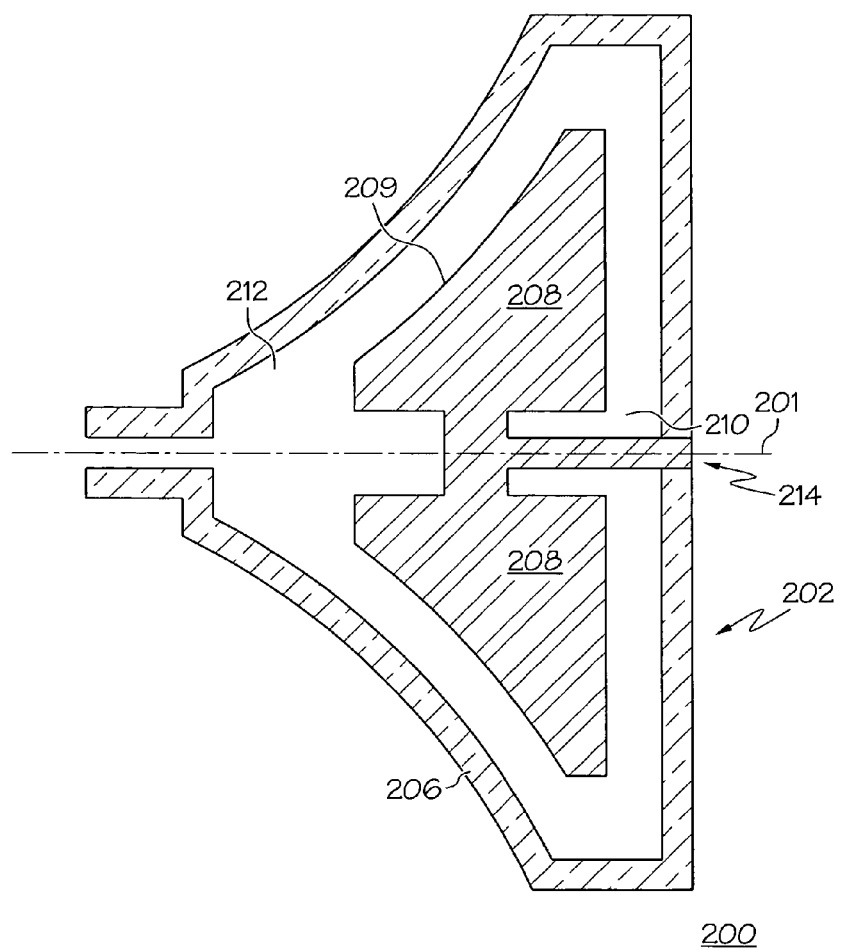
FIGS. 4-7 are simplified cross-sectional views illustrating steps in the method of fabricating the impeller of FIG. 3.
Figure 5:
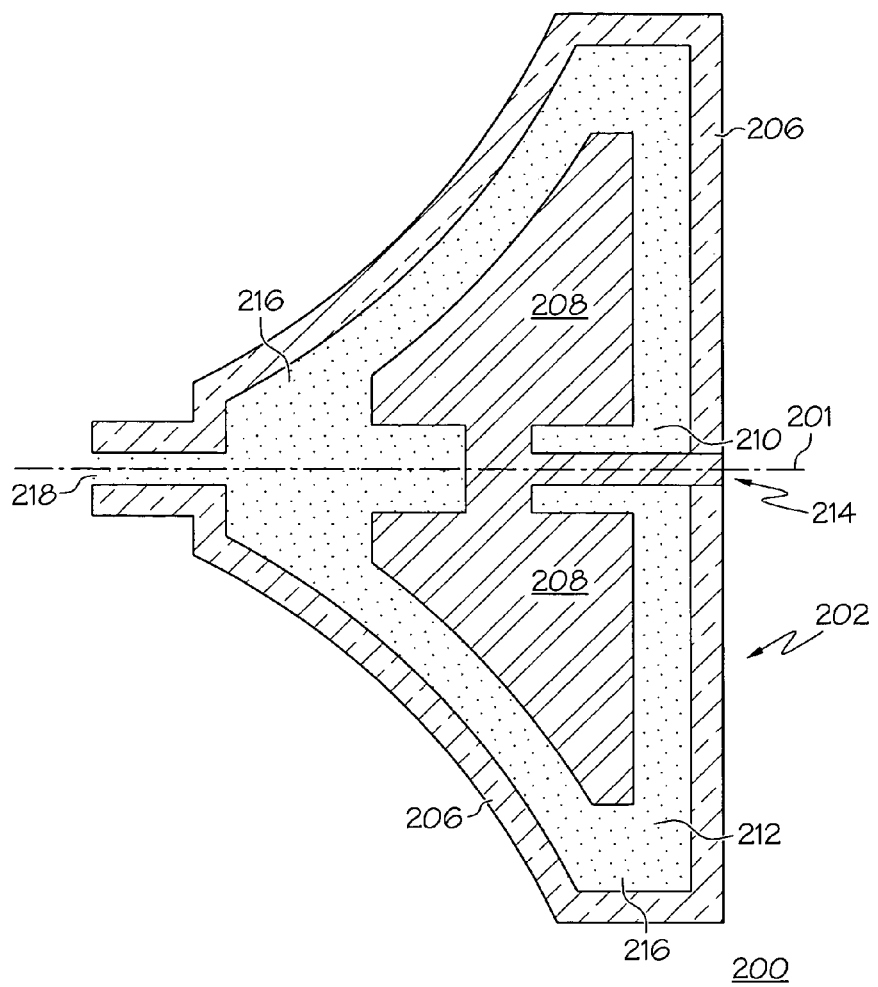
Figure 6:
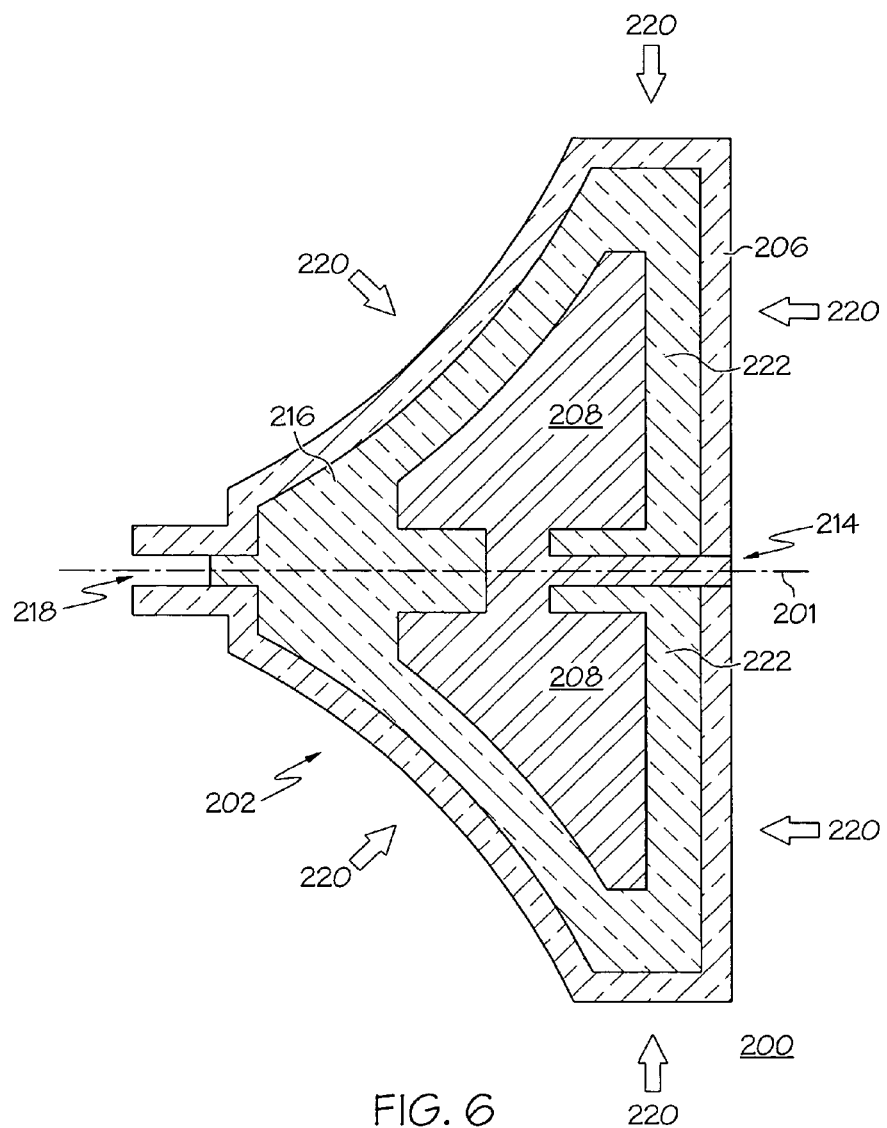

Referring now to FIGS. 4-6, illustrated are simplified cross-section views showing steps in the method of fabricating the rotor component 200, and more particularly the impeller 202 of FIG. 3. As illustrated in FIG. 4, to form the impeller 202 a steel can 206 is initially assembled according to well known practices and a core insert 208 formed of a leachable alloy, such as a mild steel, is positioned within the can 206. Prior to being inserted into the can, the core insert 208 is coated with alumina or similar material 209 to prevent diffusion of elements between the core insert 208 and a Ni superalloy component (described presently). The core insert 208 is formed of generally the same size and configuration as the internal voids 204 of FIG. 3. It should be appreciated that in an alternative embodiment a more complex geometry may be used for the core insert 208.

The steel can 206 is formed as a closed mold whose internal cavity cross-section 210 is shaped substantially identical to the external cross-section of the rotor component 200, and more particularly the impeller 202 of FIG. 3, but is slightly larger in size. A cavity 212 is thus defined between the core insert 208 and the steel can 206. A void 214 formed in the can 206 provides access to the core insert 208 during subsequent fabrication steps. In an alternate embodiment, access to the core insert 208 may be through a via in a back face (not shown) of the steel can 206 at the centerline 201.

Referring now to FIG. 5, the cavity 212 is next filled with a powdered metal 216 and the powdered metal 216 is then packed in the cavity 212. In this particular embodiment, the powdered metal 216 is a nickel-based superalloy. As previously detailed, any one of numerous superalloys that comprise carbon, aluminum, tantalum, cobalt, titanium, iron, vanadium, copper, lanthanum, chromium, molybdenum, niobium (columbium), rhenium, tungsten, hafnium, boron, zirconium, silicon, yttrium, or nickel may be used as the powdered metal 216. The cavity 212 is filled with the powdered metal 216 through an opening 218 formed in the steel can 206.

Referring now to FIG. 6, the steel can 206 is next compressed under a uniform pressure 220 at an elevated temperature in a process commonly known as hot-isostatic pressing (HIP). For example in a typical process, hot-isostatic pressing takes place at a pressure of about 15,000 psi and temperature of about 2200° C. Further specifics of this process are well known and will not be described herein in any further detail than necessary to understand the present invention. The temperature and pressure of the hot-isostatic pressing process are such that the metal powder 216 consolidates about the core insert 208 to form a cooled powder solid superalloy 222 as best seen in FIG. 6, with material properties substantially similar to a conventionally cast or forged superalloy.

Figure 7:
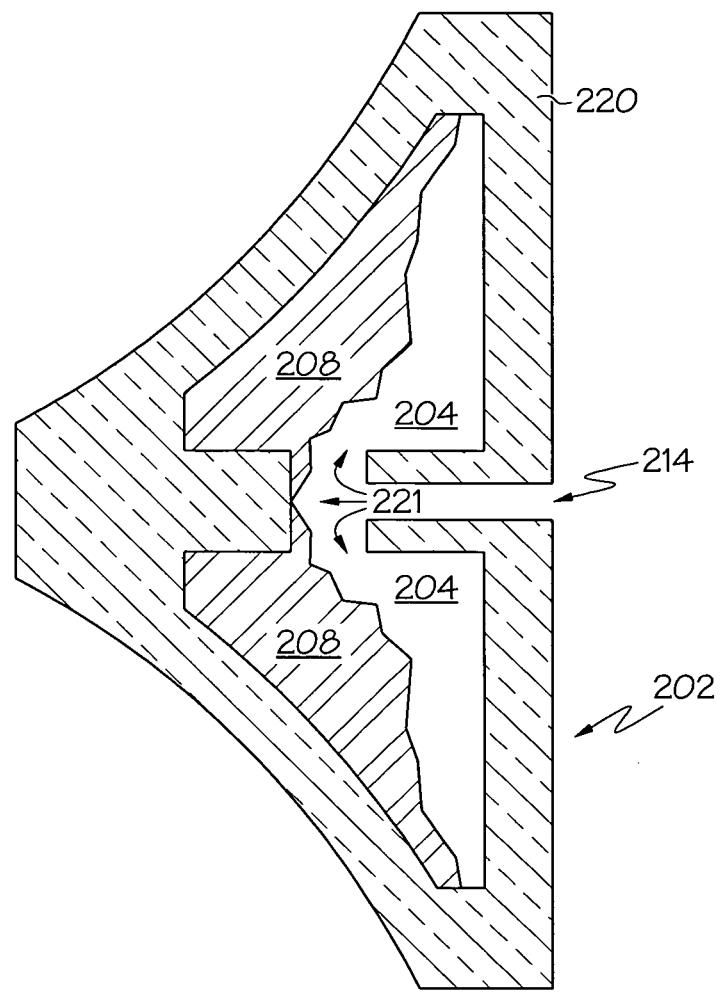

Referring now to FIG. 7, after the hot-isostatic pressing process, the impeller 202 is removed from the steel can 206. The impeller 202 at this stage comprises the impeller structure, formed about the core insert 208. The core insert 208 is next removed through a process known as leaching or chemical milling. More specifically, the core insert 208 is leached or chemically milled away (as is partially shown in FIG. 7) by a leaching agent 221 that is introduced through the void 214. In this particular embodiment, the leaching agent 221 is nitric acid, but it should be appreciated that additional leaching agents such as ammonium acetate, hydrochloric acid, and hydrofluoric acid may be used to remove the core insert 208 depending upon the composition of the core insert 208. After the core insert 208 is removed, the voids 204 become defined and a hollow structure, as previously illustrated and described in FIG. 3, is left.

Figure 8:
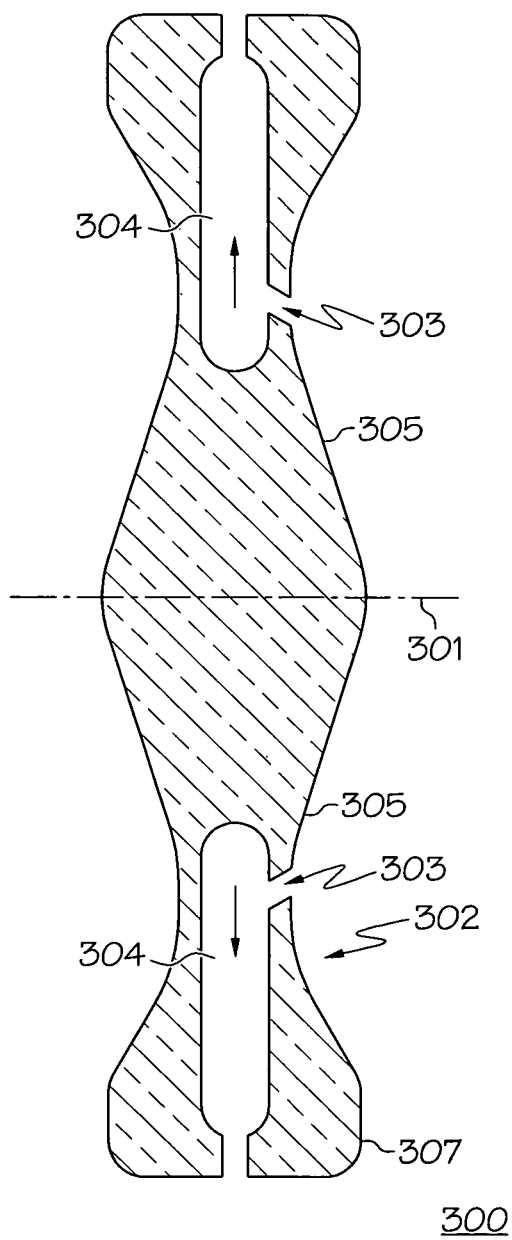
FIG. 8 is an enlarged cross-sectional view of a turbine disk of FIG. 2 showing still further details.

Illustrated in FIGS. 8-12 is a further embodiment of the present invention, and more particularly a rotor component 300 according to a second embodiment. FIG. 8 is a side sectional view of the rotor component 300, and more particularly a turbine disk 302. The rotor component 300 is formed generally similar to the rotatable turbine disk 162 of FIGS. 1 and 2 positioned in the turbine section 108. During operation, the turbine disk 302 is exposed to temperatures in excess of 1350° F. To accommodate the exposure to this heat, the turbine disk 302 is formed of a superalloy as has previously been described. More specifically, superalloys that may be used to form the turbine disk 302 include a cobalt-based or a nickel-based superalloy that can broadly be defined as comprising carbon, aluminum, tantalum, cobalt, titanium, iron, vanadium, copper, lanthanum, chromium, molybdenum, niobium (columbium), rhenium, tungsten, hafnium, boron, zirconium, silicon, yttrium, or nickel.

During operation the turbine disk 302 is exposed to temperatures in excess of 1350° F. To accommodate the exposure to this heat, the turbine disk 302 is formed of a superalloy as has previously been described. To enable operating of the turbine disk 302 at temperatures in excess of 1350° F., the turbine disk 302 includes a plurality of channels 303, each in fluidic communication with a plurality of internal voids 304. The plurality of channels 303 and plurality of internal voids 304 provide overall weight reduction and cooling passages within the turbine disc 302 structure. More particularly, the plurality of channels 303 and the plurality of internal voids 304 define a plurality of passageways that provide for a flow of cooling air, as indicated by arrows 311. The cooling air 311 flows into the rotor component 300 from a disc web portion 305 to a disk rim portion 307, thus providing a means for internal cooling of the rotor component 300, and in particular cooling of the disk rim portion 307. This cooling feature of the rotor component 300 enables operation at higher temperatures and for more efficient turbine operation. In addition, similar to the described first embodiment, the internal voids 304 also provide a reduction in overall weight of the turbine disk 302. The turbine disk 302 is formed substantially rotationally symmetric about a centerline and axis of rotation 301.

Figure 9:
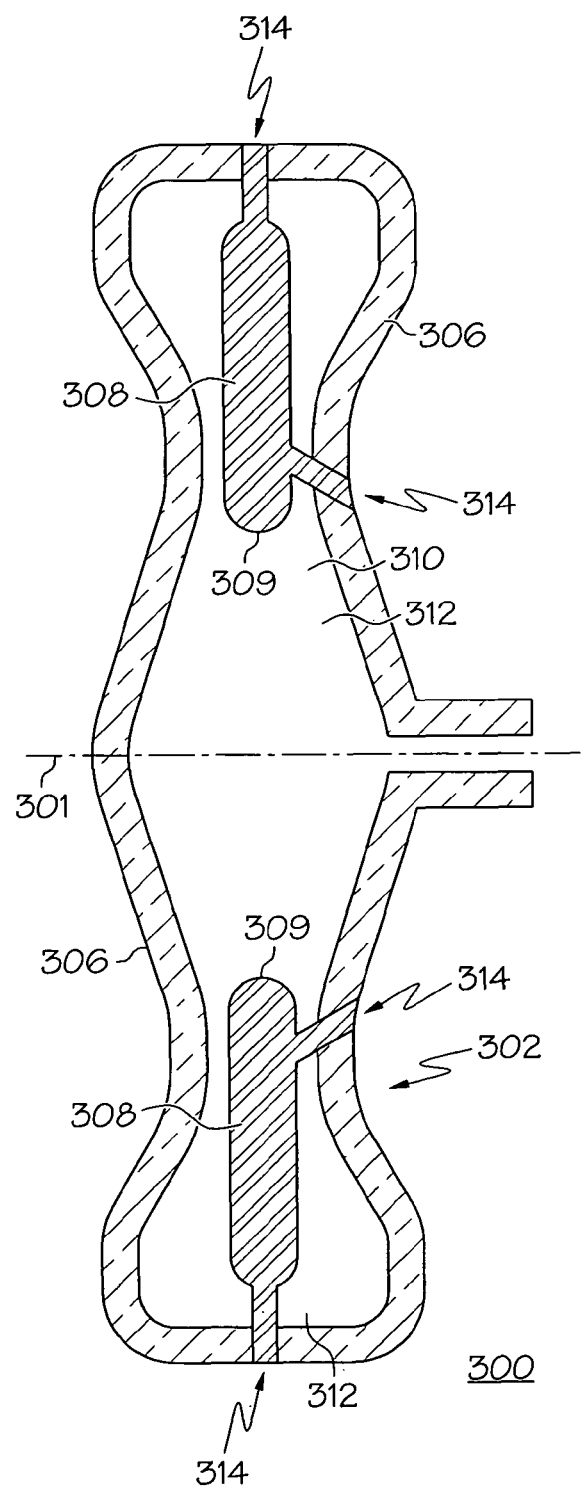
FIGS. 9-12 are simplified cross-sectional views illustrating steps in the method of fabricating the turbine disk of FIG. 8.

Referring now to FIGS. 9-12, illustrated are simplified cross-section views showing steps in the method of fabricating the rotor component 300 of FIG. 8. As illustrated in FIG. 9, to form rotor component 300, and more particularly the turbine disk 302, a steel can 306 is initially assembled according to well known practices and a core insert 308 formed of a leachable alloy, such as a mild steel, is positioned within the can 306. The core insert 308 is formed generally the same size and configuration as the internal voids 304 of FIG. 8. The core insert is coated with a diffusion barrier 309 such as alumina. It should be appreciated that in an alternative embodiment a more complex geometry may be used for the core insert 308.

The steel can 306 is formed as a closed mold whose internal cavity cross-section 310 is shaped substantially identical to the external cross-section of the turbine disk 302, but is slightly larger in size. A cavity 312 is thus formed in the can 306 defined between the core insert 308 and the steel can 306. A plurality of voids 314 provide access to the core insert 308 during subsequent fabrication steps.

Figure 10:
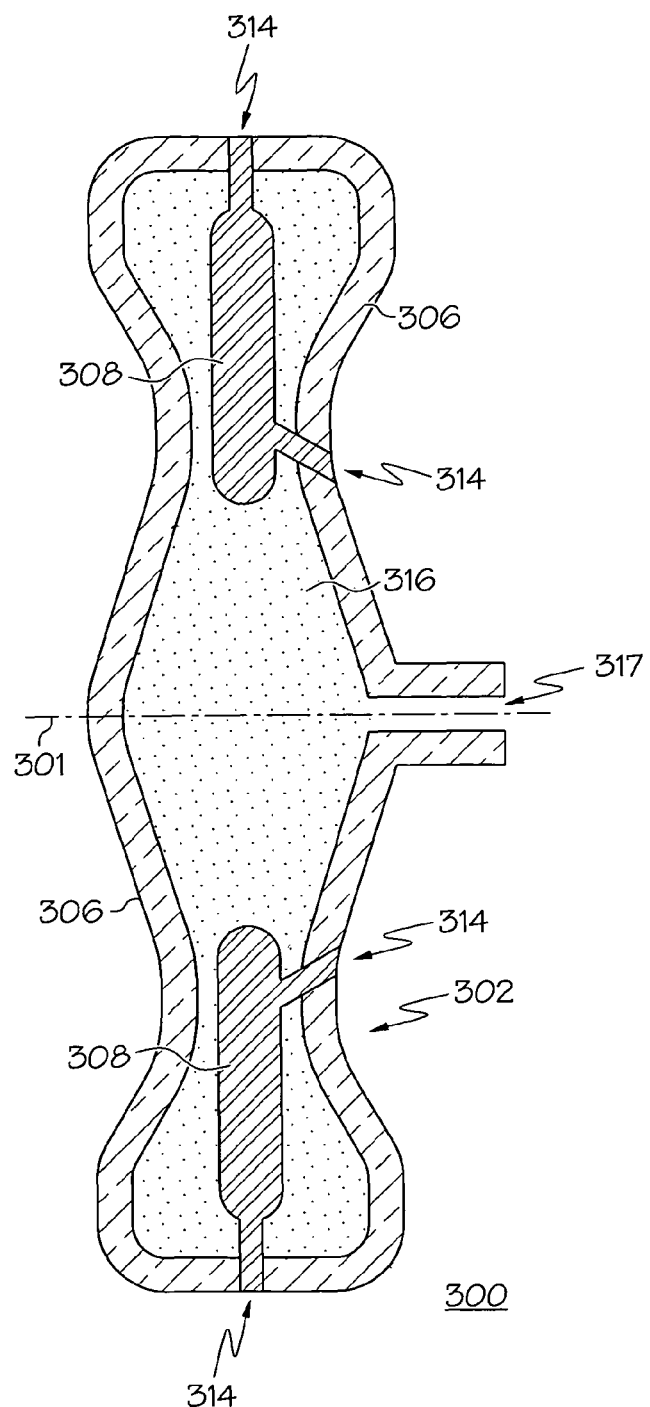

Referring now to FIG. 10, the cavity 312 is next filled with a powdered metal 316, the powdered metal 316 is then packed in the cavity 312. Similar to the first disclosed embodiment, in this particular embodiment, the powdered metal 316 is a nickel-based superalloy. As previously detailed, any one of numerous superalloys that comprise carbon, aluminum, tantalum, cobalt, titanium, iron, vanadium, copper, lanthanum, chromium, molybdenum, niobium (columbium), rhenium, tungsten, hafnium, boron, zirconium, silicon, yttrium, or nickel may be used as the powdered metal 316. The cavity 312 is filled with the powdered metal 316 through an opening 317 formed in the steel can 306.

Figure 11:
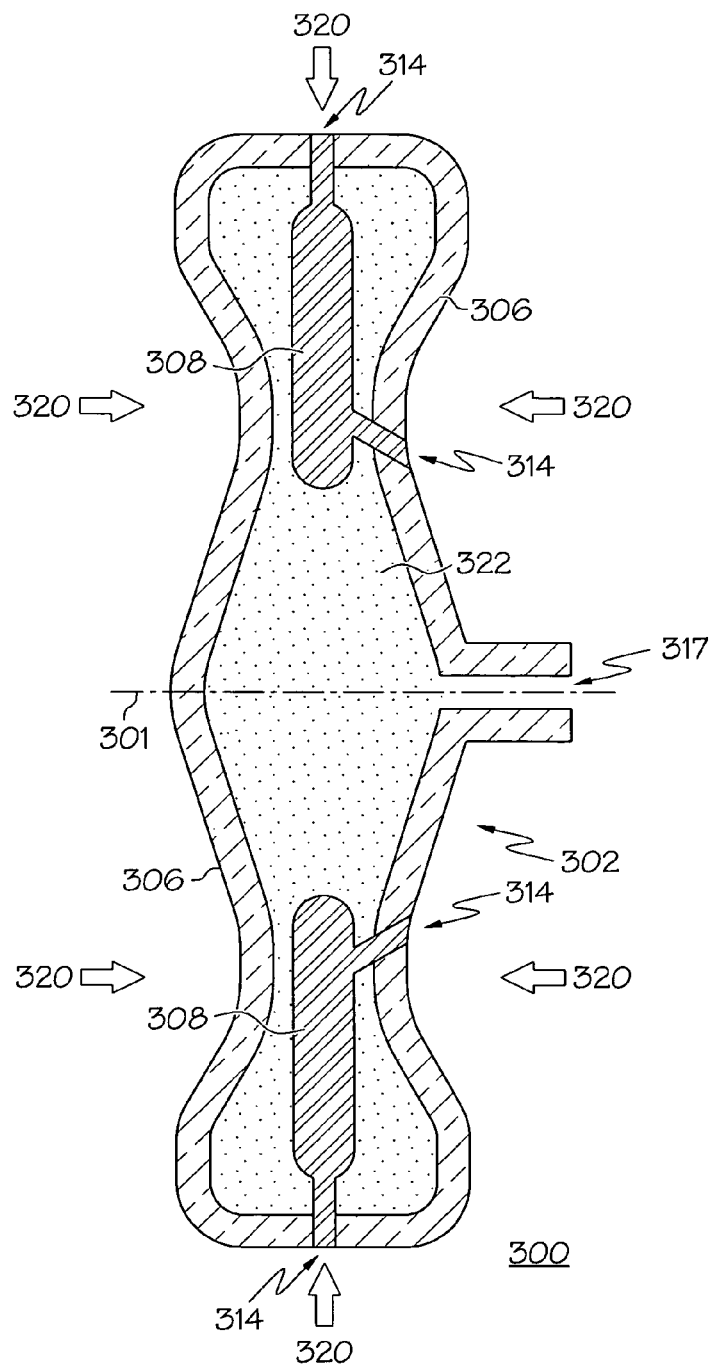

Referring now to FIG. 11, as with the previous embodiment, the steel can 306 is next compressed under a uniform pressure 320 at an elevated temperature using hot-isostatic pressing (HIP) as previously described with regard to the first embodiment. The temperature and pressure of the hot-isostatic pressing process are such that the metal powder 316, once cooled, consolidates about the core insert 308 to form a solid superalloy 322 about the core insert 308 as best seen in FIG. 11, with material properties substantially similar to a conventionally cast or forged superalloy.

Figure 12:
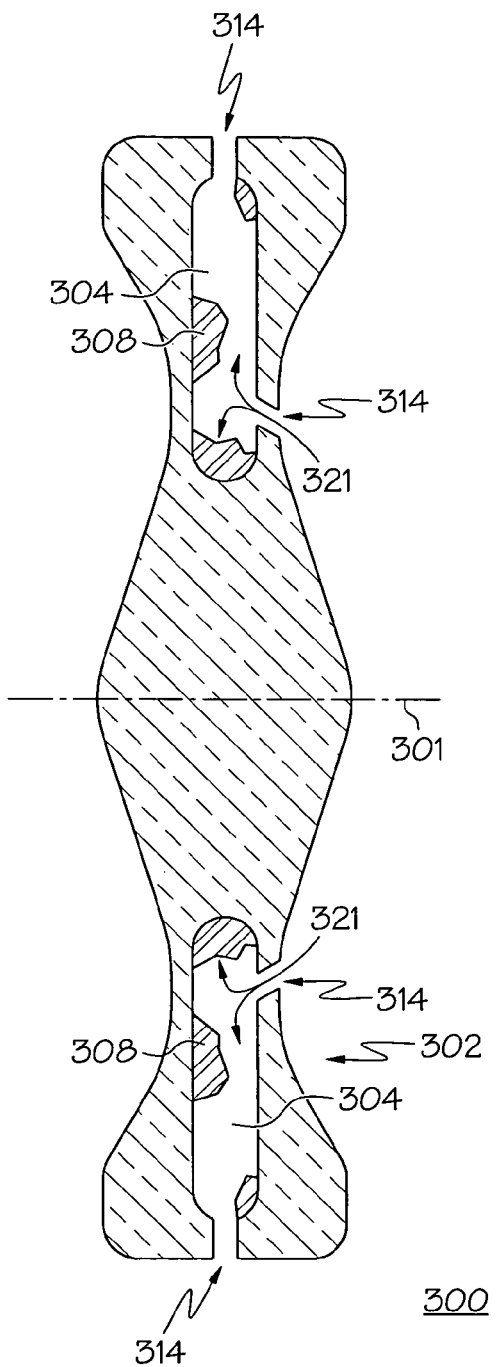

Referring now to FIG. 12, after the hot-isostatic pressing process, the turbine disk 302 is removed from the steel can 306. The turbine disk 302 at this stage comprises the turbine disk structure, formed about the coated core insert 308. The core insert 308 is next removed as previously described with regard to the first embodiment. More specifically, the core insert 308 is next leached away (as is partially shown in FIG. 12) by a leaching agent 321 that is introduced through the voids 314. Similar to the first embodiment, in this particular embodiment the leaching agent 321 is nitric acid, but it should be appreciated that additional leaching agents such as ammonium acetate, hydrochloric acid, and hydrofluoric acid may be used to remove the core insert 308. After the core insert 308 is removed, the voids 304 become defined and a hollow turbine disk structure as previously illustrated and described in FIG. 8, is left.

Figure 13:
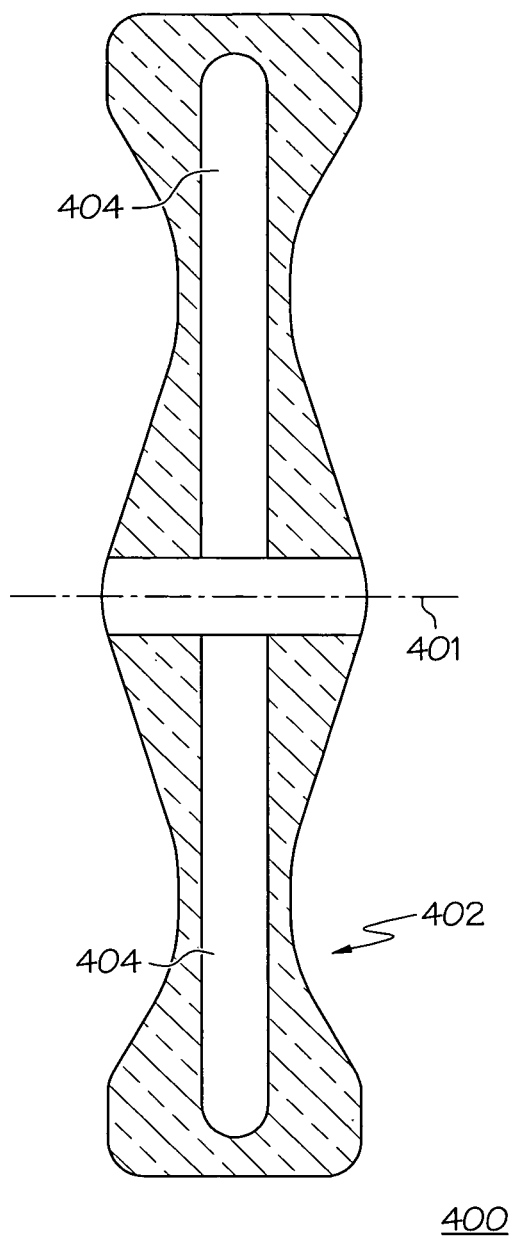
FIG. 13 is an enlarged cross-sectional view of yet another embodiment of a turbine disk fabricated according to the present invention.

Illustrated in FIG. 13 is a further embodiment of the present invention, and more particularly a rotor component 400. In contrast to rotor component 300 of FIGS. 8-12 which includes both weight reduction and a means for cooling of the rotor component, rotor component 400 includes only a significant weight reduction. FIG. 13 is a side sectional view of the rotor component 400, and more particularly, a turbine disk 402. More specifically, the rotor component 400 is formed generally similar to the method described for the fabrication of the rotor component 300 of FIGS. 8-12 and accordingly will not be further described herein.

In contrast to prior art turbine disks, in this particular embodiment of the turbine disk 402 a plurality of internal voids 404 are formed to provide overall weight reduction of the structure. In contrast to the rotor component 300 of FIGS. 8-12, the internal voids 404 provide for a greater overall reduction in structural weight of the rotor component 400, yet do not provide for internal cooling of the turbine disk 402.

Figure 14:
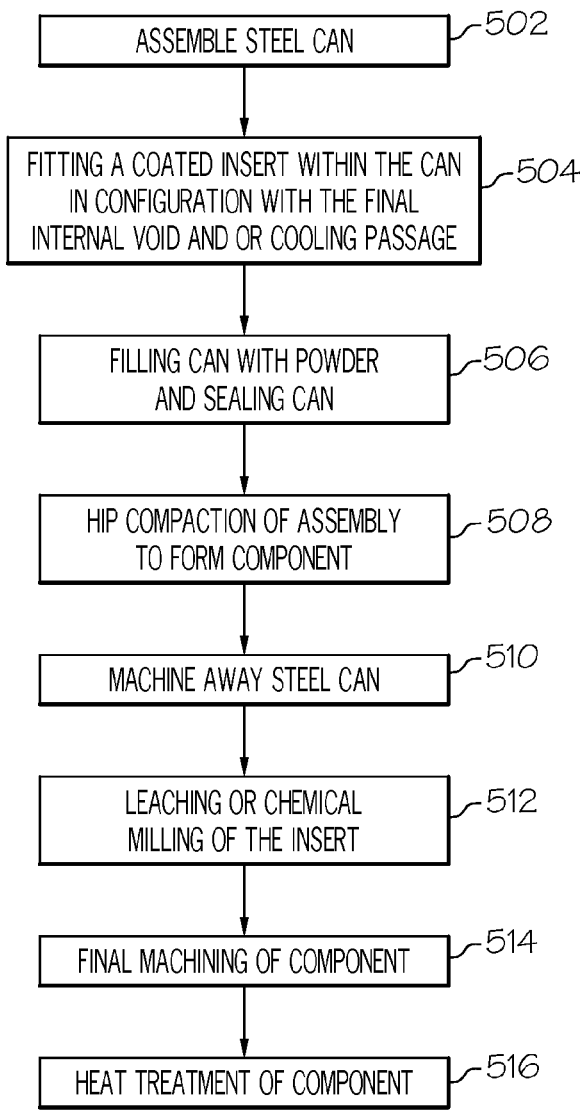
FIG. 14 is a flow diagram of a method of manufacture in accordance with an exemplary embodiment according to the present invention.

Referring now to FIG. 14, illustrated by a flow diagram is a method of manufacture 500 in accordance with an exemplary embodiment of the present invention. It should be appreciated that the rotor components 200, 300, and 400 may be formed according to the method disclosed herein. As previously stated, a can or mold, formed generally similar to the steel can 206 of FIGS. 4-7, or the steel can 306 of FIGS. 9-12, is assembled in a first step 502, the steel can preferably has an internal cavity cross-section of a similar shape to the external cross-section of the rotor component 200, or rotor component 300, respectively, but slightly larger in size. Next, a core insert having a cross-section of generally similar configuration as the desired resultant void is positioned 504 within the steel can and coated with a diffusion barrier. The steel can is next filled 506 with a superalloy powder, and the assembly is compacted using HIP process techniques 508. After cooling of the structure, the steel can is next machined away as illustrated in step 510. Next, a leaching agent is introduced, and the core insert is removed in a leaching step 512. After the core insert is completely removed and the resultant void is defined, the final component is next machined 514 and undergoes a final heat treatment step 516 to form the resultant rotor component having at least one void formed therein.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiments. It should be understood that various changes can be made in the function and arrangement of elements without departing from the scope of the invention as set forth in the appended claims and the legal equivalents thereof.

What is claimed is:

1. A method of forming a rotationally mounted rotor component having at least one internal void enclosed therein in at least one selected area thereof comprising the steps of:
    forming a mold having an internal cross-section shape that is substantially identical to that of the rotationally mounted rotor component;
    coating a core insert with a diffusion barrier forming a coated core insert;
    selectively positioning the coated core insert within the mold in a selective position corresponding to the at least one selected area of the rotationally mounted rotor component to be formed, the core insert having a cross-section shape that is substantially identical to the at least one internal void;
    filling the mold with a superalloy material powder;
    hot-isostatic pressing the mold and superalloy material powder to consolidate the superalloy material powder about the coated core insert and form a superalloy structure about the coated core insert, the superalloy structure having at least one void in fluid communication with the coated core insert and comprising the rotationally mounted rotor component to be formed;
    removing the mold from the superalloy structure;
        removing the coated core insert from inside the superalloy structure, thereby defining the at least one internal void enclosed within the at least one selected area of the rotationally mounted rotor component, wherein the step of removing the coated core insert comprises leaching away the coated core insert using a leaching agent introduced through the at least one void that terminates inside the superalloy structure, the rotationally mounted rotor component being solid on all surrounding sides of the at least one internal void, except for the at least one void extending from an external surface of the rotationally mounted rotor component to the at least one internal void.

2. A method of forming a rotor component as claimed in claim 1, wherein the rotor component is an impeller.

3. A method of forming a rotor component as claimed in claim 1, wherein the rotor component is a turbine disk.

4. A method of forming a rotor component as claimed in claim 1, wherein the step of forming a mold includes assembling a steel can including the at least one void in fluid communication with the coated core insert.

5. A method of forming a rotor component as claimed in claim 1, wherein the core insert is formed of a mild steel material.

6. A method of forming a rotor component as claimed in claim 5, wherein the superalloy material powder is a cobalt-based alloy.

7. A method of forming a rotor component as claimed in claim 1, wherein the superalloy material powder is a nickel-based based alloy.

8. A method of forming a rotor component as claimed in claim 1, wherein the leaching agent is nitric acid.

9. A method of forming a rotor component having at least one internal void formed therein in at least one selected area comprising the steps of:
  assembling a steel can to define a mold having an internal cross-section shape that is substantially identical to that of a resultant rotor component;
  selectively positioning a coated mild steel core insert within the mold, the coated mild steel core insert having a cross-section shape that is substantially identical to the at least one internal void to be formed and enclosed in the rotor component in the at least one selected area, the coated mild steel core insert substantially enclosed within the mold and in fluid communication with at least one void in the steel can;
  filling the steel can with a superalloy material powder and sealing the steel can;
  hot-isostatic pressing the mold and powder to consolidate the powder about the coated mild steel core insert and form a superalloy structure;
  machining away the steel can from the superalloy structure;
  chemically milling away the coated mild steel core insert from inside the superalloy structure using a leaching agent introduced into the superalloy structure via the at least one void, thereby defining the at least one internal void enclosed within the rotor component;
  machining the rotor component; and
  heat treating the rotor component,
  wherein the rotor component is solid on all surrounding sides of the at least one internal void, except for the at least one void extending from an external surface of the rotationally mounted rotor component to the at least one internal void.

10. A method of forming a rotor component as claimed in claim 9, wherein the rotor component is an impeller.

11. A method of forming a rotor component as claimed in claim 9, wherein the rotor component is a turbine disk.

12. A method of forming a rotor component as claimed in 9, wherein the rotor component is a turbine disk with an internal cooling passage.

13. A method of forming a rotor component as claimed in claim 9, wherein the superalloy material powder is a cobalt-based alloy.

14. A method of forming a rotor component as claimed in claim 9, wherein the superalloy material powder is a nickel-based based alloy.

15. A method of forming an impeller from a superalloy material powder, the impeller having at least one internal void formed and enclosed in at least one selected area therein to provide overall weight reduction to the impeller, the method comprising the steps of:
  forming a mold having an internal cross-section shape that is substantially identical to that of the impeller to be formed;
  selectively positioning a coated core insert within the mold in a position corresponding to the at least one selected area of the impeller to be formed, the coated core insert having a cross-sectional shape that is substantially identical to the at least one internal void;
  filling the mold with the superalloy material powder;
  hot-isostatic pressing the mold and the superalloy material powder to consolidate the superalloy material powder about the coated core insert to form a superalloy structure substantially enclosing the coated core insert, the coated core insert in fluid communication with at least one void defined in the superalloy structure;
  removing the mold from the superalloy structure; and
  removing the coated core insert from inside the superalloy structure using a leaching agent introduced into the superalloy structure via the at least one void therein, thereby defining the at least one internal void enclosed in the at least one selected area within the impeller, the impeller being solid on all surrounding sides of the at least one internal void, except for the at least one void extending from an external surface of the impeller to the at least one internal void.

16. The method of claim 15, wherein the step of selectively positioning the coated core insert comprises positioning the coated core insert within the mold in a position corresponding to a relatively low stress area of the impeller to be formed.

\* \* \* \* \*